(12) United States Patent
Kulkarni

(10) Patent No.: US 8,294,811 B2
(45) Date of Patent: Oct. 23, 2012

(54) AUTO-FOCUSING TECHNIQUES BASED ON STATISTICAL BLUR ESTIMATION AND ASSOCIATED SYSTEMS AND METHODS

(75) Inventor: Prajit Kulkarni, San Jose, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 452 days.

(21) Appl. No.: 12/535,331

(22) Filed: Aug. 4, 2009

(65) Prior Publication Data

US 2011/0032413 A1 Feb. 10, 2011

(51) Int. Cl.
*G03B 13/00* (2006.01)
*H04N 5/232* (2006.01)

(52) U.S. Cl. ......................... 348/351; 382/254
(58) Field of Classification Search ........... 348/345, 348/349, 350, 351; 382/254, 244, 263, 264
See application file for complete search history.

(56) References Cited

U.S. PATENT DOCUMENTS

| | | | | | |
|---|---|---|---|---|---|
| 5,475,429 | A | * | 12/1995 | Kodama | 348/350 |
| 6,151,415 | A | * | 11/2000 | Acharya et al. | 382/255 |
| 6,215,916 | B1 | * | 4/2001 | Acharya | 382/298 |
| 6,236,765 | B1 | * | 5/2001 | Acharya | 382/276 |
| 6,888,564 | B2 | * | 5/2005 | Caviedes et al. | 348/180 |
| 6,961,472 | B1 | * | 11/2005 | Acharya et al. | 382/240 |
| 7,720,305 | B2 | * | 5/2010 | Shi et al. | 382/275 |
| 2007/0297784 | A1 | * | 12/2007 | Wong et al. | 396/89 |
| 2008/0218635 | A1 | * | 9/2008 | Tsuruoka | 348/607 |
| 2009/0324117 | A1 | * | 12/2009 | Demandolx | 382/254 |
| 2010/0188558 | A1 | * | 7/2010 | Gamadia et al. | 348/345 |
| 2010/0201798 | A1 | * | 8/2010 | Ren et al. | 348/78 |
| 2010/0253447 | A1 | * | 10/2010 | Mallat | 333/132 |
| 2012/0019710 | A1 | * | 1/2012 | Oi | 348/349 |

OTHER PUBLICATIONS

Chang, Yu, Vetterli. *Adaptive Wavelet Thresholding for Image Denoising and Compression*. Sep. 2000, IEEE Trans. Image Proc., vol. 9, No. 9, pp. 1532-1546.
Dominguez-Molina, Gonzalez-Farias, and Rodriguez-Dagnino. *A Practical Procedure to Estimate the Shape Parameter in the Generalized Gaussian Distribution*. CIMAT Tech. Rep. I-01-18 eng.pdf. Website: http://www.cimat.mx/reportes/enlinea/I-01-18 eng.pdf.

(Continued)

*Primary Examiner* — Aung S Moe
(74) *Attorney, Agent, or Firm* — Kramer Levin Naftalis & Frankel LLP

(57) ABSTRACT

This is generally directed to auto-focusing techniques based on statistical blur estimation. An image can be captured at two or more candidate lens positions. The amount of blur of each image can then be determined, and the image containing the least amount of blur can be chosen as the "in-focus" image. In some embodiments, the amount of blur of an image can be determined by identifying how "Gaussian" an image is. Characteristics that are more Gaussian in nature can indicate that the image is more blurry. The Gaussianity of an image can be determined by estimating a generalized Gaussian shape parameter for that image. A smaller shape parameter can indicate the image is less Gaussian in nature. The shape parameter can be estimated in any suitable manner such as, for example, through a 2-d discrete wavelet transform, through a 1-d discrete wavelet transform, or through any other suitable manner.

27 Claims, 9 Drawing Sheets

OTHER PUBLICATIONS

Ilić, Pižurica, Vansteenkiste, and Philips. *Image Blur Estimation Based on the Average Cone of Ratio in the Wavelet Domain*. Proceedings—SPIE The International Society for Optical Engineering (pp. 72480F1-72480F10). International Society for Optical Engineering; vol. 7248, 2009.

Sharifi and Leon-Garcia. *Estimation of Shape Parameter for Generalized Gaussian Distributions in Subband Decompositions for Video*. Feb. 1995, IEEE Trans. Circuits and Systems Video, vol. 5, No. 1, pp. 52-56.

Lee, Jung, Kim, and Ko. *An Advanced Video Camera System with Robust AF, AE and AWB Control*. 2001, IEEE Trans. Cons. Elec., vol. 47, No. 3, pp. 694-699.

Mallat *A Theory for Multiresolution Signal Decomposition: The Wavelet Representation*. Jul. 1989, IEEE Trans. Patt. Analysis and Mach. Intelligence, vol. 11, No. 7, pp. 674-693.

Rooms, Ronsse, Pizurica, and Philips. PSF Estimation with Applications in Autofocus and Image Restoration. *Proceedings—SPS Benelux Signal Processing Symposium* (pp. S02-1-S02-4). IEEE; 2002.

Rooms. Estimating Image Blur in the Wavelet Domain. *Proceedings—ICAASP International Conference on Acoustics, Speech and Signal Processing* (pp. IV-4190) IEEE; vol. 4, 2002.

Shih. Autofocus Survey: A Comparison of Algorithms. *Proceedings—SPIE The International Society for Optical Engineering* (pp. 65020B1-65020B11). International Society for Optical Engineering; vol. 6502, 2007.

Tong, Li, Zhang, and Zhang. Blur Detection for Digital Images using Wavelet Transform. *Proceedings—ICME International Conference on Multimedia and Expo* (pp. 17-20). IEEE; vol. 1, 2004.

Wang, Li, Li, and Wang. *A Fast Parameter Estimation of Generalized Gaussian Distribution*. Proceedings—ICAASP International Conference on Acoustics, Speech, and Sginal Processing (pp. 101-104). IEE; vol. 1, 2006.

\* cited by examiner

AUTO-FOCUSING TECHNIQUES BASED ON STATISTICAL BLUR ESTIMATION AND ASSOCIATED SYSTEMS AND METHODS

FIELD OF THE INVENTION

The present invention relates to auto-focusing techniques that are based on statistical blur estimation. In particular, the present invention relates to determining a lens position to focus an image based on the "Gaussianity" of the image at that lens position.

BACKGROUND OF THE INVENTION

As digital signal processing techniques become more sophisticated, a wide range of advanced features are being included in imaging systems (e.g., still cameras, video cameras, or other imaging systems). For example, digital zoom, image stabilizers, automatic exposure, automatic white balance, and auto-focus are just a few examples of the many features now available to imaging systems. As the imaging systems improve, however, so do these available features.

Auto-focus, one of the features often included in imaging systems, generally operates by bringing an image into focus by adjusting the focal length, or "lens position" of the imaging system. An image is said to be "in-focus" when the sharpness of the image has been sufficiently optimized. At this point, the lens of the imaging system is considered to be at the "optimal" lens position. Traditionally, an auto-focusing system employs a particular algorithm to calculate this optimal lens position by estimating the sharpness of an image at several candidate lens positions. The lens is then moved (e.g., by a lens driver) to the lens position that produces the peak amount of sharpness for the image.

To estimate the sharpness of an image at a candidate lens position, the imaging system typically processes the image with a high-pass filter or a band-pass filter in order to analyze the high frequencies of that image (the high frequencies of an image are typically indicative of edge detail). The "sharpness score" of the candidate lens position can then be calculated by measuring the amount of accumulated, high frequency content in the filtered image signal. The candidate lens position that produces the highest sharpness score is then used as the optimal lens position.

This approach of estimating the sharpness of an image has several drawbacks and limitations, however. For example, sharpness scores are highly affected by the presence of noise. Accordingly, auto-focus system that estimate sharpness must also account for noise in image, typically by building large filters into the system. Such filters can result in, for example, an increased hardware gate count, an increase in size, and an overall increase in the complexity of an auto-focus system. As another example, sharpness scores are highly dependent upon the image content. As a result, thresholds must be used during various stages of the sharpness computations. These threshold are a function of the image content and also a function of the particular filter being used, thus preventing the creation of a general or universal technique for estimating sharpness scores that can be implemented in any imaging system. Furthermore, these thresholds are greatly affected by luminance levels. In fact, under certain luminance conditions, the auto-focus system may not even operate correctly. Thus, not only are auto-focus systems that estimate sharpness highly limited since they are not universal and must be separately tailored for each imaging system, but they also do not operate under all luminance conditions. Although the problem of luminance conditions can be lessened by recalculating thresholds on the fly, doing so would adversely lead to a substantial increase in hardware gate count and complexity of the system.

DETAILED DESCRIPTION OF THE INVENTION

Figure 1:
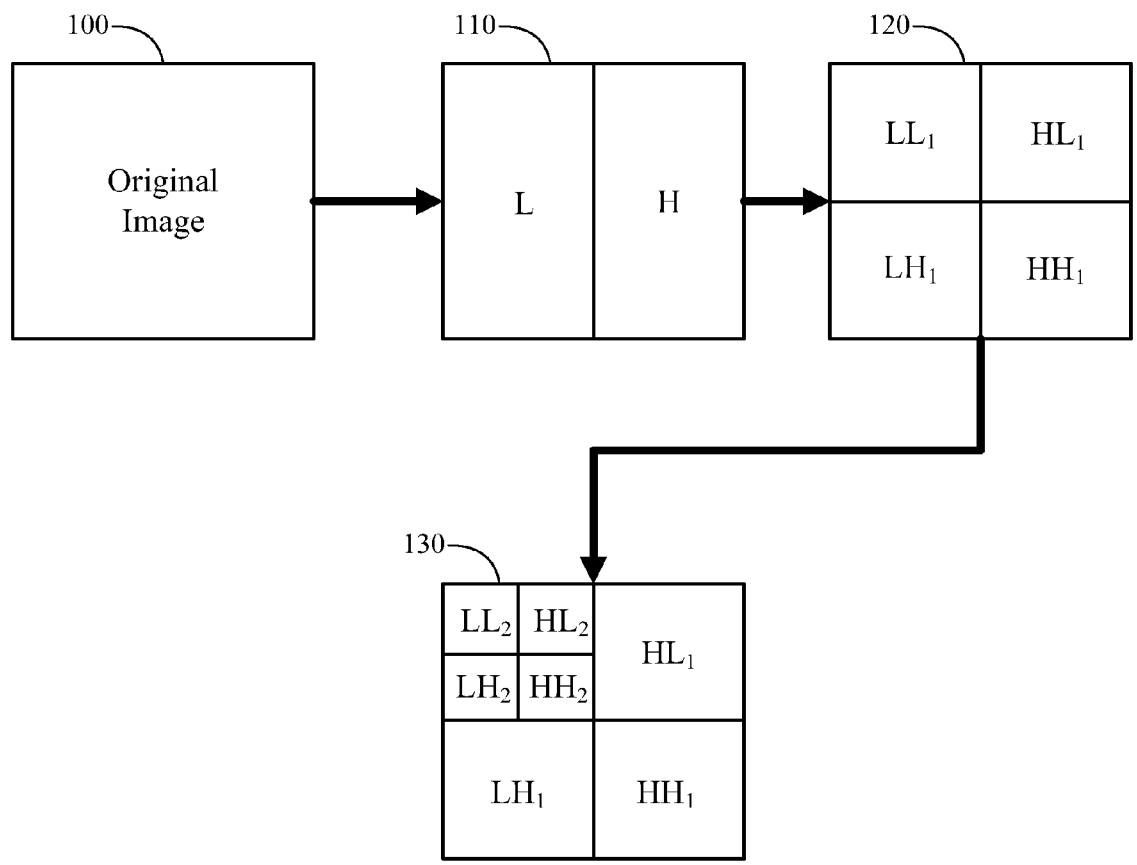
FIG. 1 shows illustrative discrete wavelet transform decomposition subbands in accordance with some embodiments of the invention.

Discussed herein are systems and methods for auto-focusing an image based on statistical blur estimation. In particular, an image can be focused based on the "Gaussianity" of that image at varying lens positions. As used herein, the term "lens position" refers to a position of a lens in an imaging system that results in a particular focal length. By adjusting the lens position of an imaging system, an image can be brought into and out of focus.

A blurred image can be mathematically described as the convolution of the in-focus version of that image with a Gaussian blur kernel. For example, a blurred image can be modeled as:

$$g(x,y)=(h*f)(x,y)$$

where $g(x,y)$ is the blurred image, $f(x,y)$ is the in-focus image, and $h(x,y)$ is the Gaussian blur kernel. As an image become more out-of-focus and thus more blurred, its characteristics typically become more "Gaussian" in nature. Accordingly, by measuring how Gaussian an image is at several candidate lens positions, the blurriness of that image can be determined at those lens positions. To bring an image into focus, the lens may then be moved to the candidate lens position that results in the least Gaussian image. As used herein, the term "candidate lens position" refers to one of several lens positions at which an image is analyzed to determine which candidate lens position results in the most suitably in-focus image. Gaussian functions will be described in greater detail below. However, the Gaussianity of an image can be generally described by noting that, as an image becomes more Gaussian in nature, the high frequency details (e.g., lines) of that image becomes smoother (e.g., less defined) in shape.

To analyze the high frequency content of an image, the image data can be transformed into a representation that effectively depicts its frequency content. For example, transforms such as a Fourier transform, a Laplace transform, a wavelet transform, or any other suitable transform can be used. One exemplary type of transform, the Discrete Wavelet Transform ("DWT"), can have the benefit of providing information related to spatial content as well as frequency content when an image is analyzed. For example, through a single transform operation, a DWT transform can provide spatial information about the edges in the image such as, for example, horizontal edge information, vertical edge information, and diagonal edge information. Although the following disclosure may reference using a Discrete Wavelet transform or other specific type of transform, these references are presented for the purpose of illustration and not for limitation. Rather, one skilled in the art could appreciate that any suitable type of transform could alternatively or additionally be used.

A DWT can be performed on a one-dimensional signal such as, for example, the image signal from a row of pixels in an image. This "one-dimensional DWT" can function as a simultaneous low-pass and high-pass filtering of the one-dimensional signal that is subsequently followed by down-sampling (e.g., discarding every other coefficient that was produced by the filtering). For example, the down-sampling can be performed in order that the composite filtered signal (e.g., the signal generated by the one-dimensional DWT) is the same length as the original signal. This transform can thus result in a first series of coefficients obtained from the low pass filtering and a second series of coefficient obtained from the high pass filtering, where each of these filtering results can be referred to as a "subband." Similarly, a two-dimensional DWT can be performed on a two-dimensional signal such as, for example, an image signal containing pixel information for the rows and columns of an image. The two-dimensional DWT is a separable operation that can include, for example, a one-dimensional DWT that is applied successively to the pixel rows of the image followed by a one-dimensional DWT that is applied to the resulting pixel columns of the image. One skilled in the art could appreciate, however, that the two-dimensional DWT can be performed in any suitable fashion such as, for example, applying a one-dimensional DWT to the pixel columns followed by applying a one-dimensional DWT to the resulting pixel rows. Application of a two-dimensional DWT decomposition can result in the creation of four subbands. DWT decomposition can thus be interpreted as the decomposition of a signal into a set of independent, spatially-oriented frequency bands.

FIG. 1 shows illustrative subbands that can be created after performing two stages of a two-dimensional DWT to an image signal. Original image 100 can illustrate the original image. During the first stage of the DWT transform, a one-dimensional DWT can be applied to the rows of the pixels of original image 100 (e.g., horizontally), resulting in intermediate stage 110. Intermediate stage 110 can result in a subband of low pass filter coefficients, L, and in a subband of high pass filter coefficients, H. To complete the first stage of the DWT transform, a one-dimensional DWT can be applied to the columns of the pixel (e.g., vertically), resulting in first stage decomposition 120. Four subbands can be created by this first stage application of a DWT: $LL_1$, $LH_1$, $HL_1$, and $HH_1$. $LL_1$ can correspond to the samples obtained by applying a low pass filter in the horizontal direction and a low pass filter in the vertical direction. $LH_1$ can correspond to the samples obtained by applying a low pass filter in the horizontal direction and a high pass filter in the vertical direction. $HL_1$ can correspond to the samples obtained by applying a high pass filter in the horizontal direction and a low pass filter in the vertical direction. $HH_1$ can correspond to the samples obtained by applying a high pass filter in the horizontal direction and a high pass filter in the vertical direction. The subscript "1" indicates that this is the first stage of DWT decomposition. Similarly, a second stage of DWT decomposition can be performed on the $LL_1$ subband, as illustrated by second stage decomposition 130.

As mentioned above, a DWT can provide spatial information about an image. For example, the HL subband can contain information related to vertical edges, the LH subband can contain information related to horizontal edges, and the HH subband can contain information related to diagonal edges. The LL subband can appear similar to a reduced-resolution version of the original image. As this LL subband information may not be as useful for determining image blurriness as the information contained in the HL subband, the LH subband, and the LL subband, in some embodiments this information can be discarded. For example, when a system includes a limited amount of memory, the LL subband information may be discarded rather than stored in memory.

When a DWT is performed on a blurry image, the coefficients produced by the high pass filter can be distributed closer to zero. In other words, the probability distribution function ("PDF") of the coefficients of an out-of-focus image can be more Gaussian in appearance. When a DWT is performed on a sharper image, however, the coefficients produced by the high pass filter can have a higher distribution away from zero. Thus, the PDF of the coefficients of a substantially in-focus image can be less Gaussian in nature. Accordingly, by comparing the PDF of the coefficients of an image to a Gaussian function, an auto-focus system can quantify the amount of blurriness of an image and determine whether an image is substantially in-focus or not.

Figure 2:
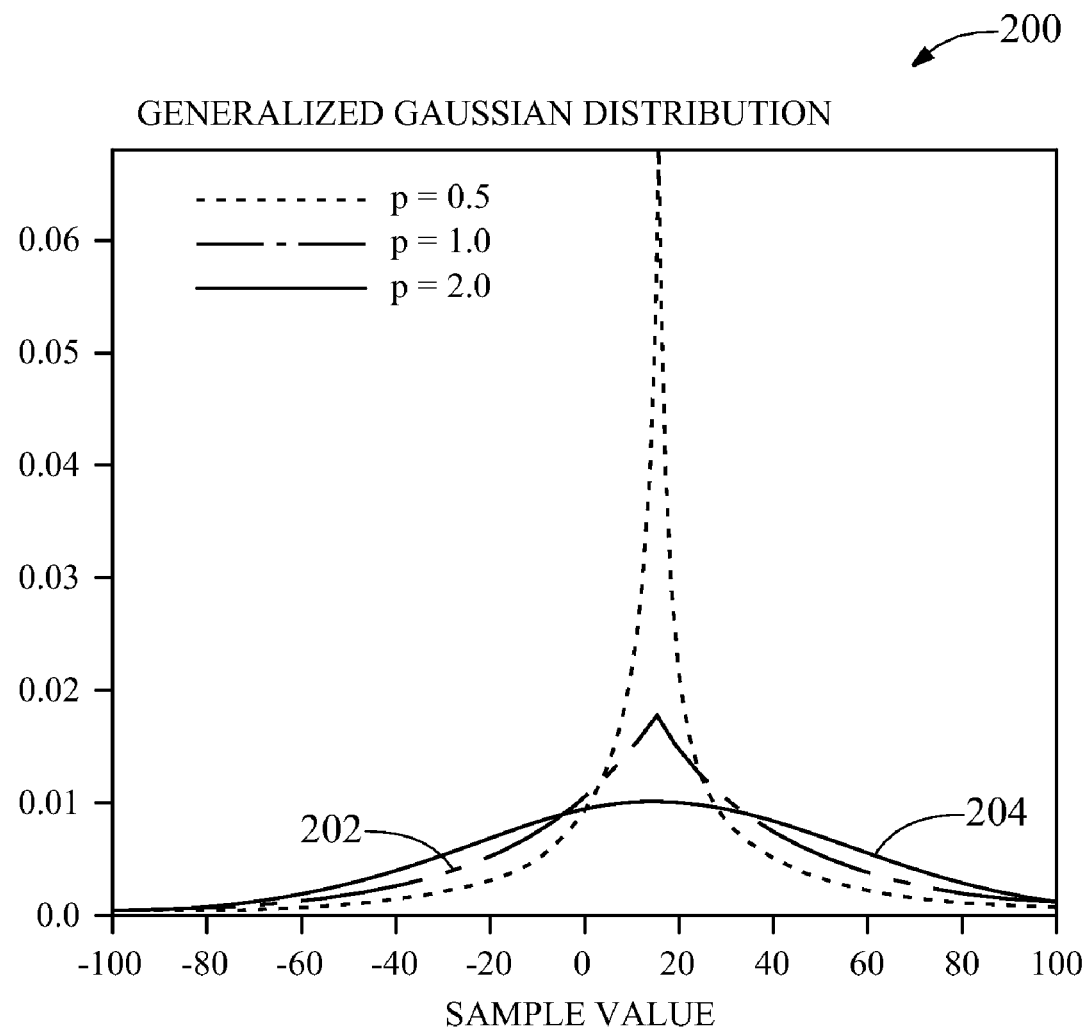
FIG. 2 shows an illustrative Generalized Gaussian Distribution in accordance with some embodiments of the invention.

FIG. 2 shows illustrative Generalized Gaussian Distribution Function 200. The generalized Gaussian distribution itself includes a family of parametric, symmetric, and continuous probability distributions on the real line. This family includes, for example, normal Gaussian distributions and Laplacian distributions as special cases, and uniform distributions and delta distributions as limiting cases. The generalized Gaussian distribution function can be given by:

$$f(x, \mu, \sigma, \rho) = \alpha e^{-(b|x-\mu|)^\rho} \qquad 2$$

where, $\mu$, $\sigma$, and $\rho$ are, respectively, the mean, variance, and shape parameter of the distribution. The constants a and b are positive and can be given by, respectively:

$$a = \frac{b\rho}{2\Gamma\left(\frac{1}{\rho}\right)} \qquad 3$$

$$b = \frac{1}{\sigma}\sqrt{\frac{\Gamma\left(\frac{3}{\rho}\right)}{\Gamma\left(\frac{1}{\rho}\right)}} \qquad 4$$

$\Gamma$ is the standard Gamma function and can be given by:

$$\Gamma(y) = \int_0^\infty t^{y-1} e^{-t} dt \qquad 5$$

The shape parameter, $\rho$, of the generalized Gaussian distribution can determine how quickly the function decays, where a higher value of $\rho$ can result in a slower rate of decay. For example, a value of $\rho = \infty$ can result in a uniform distribution while a value of $\rho = 0$ can result in a more "peaked" or delta distribution. As another example, as illustrated in FIG.

2, a value of ρ=1 can result in Laplacian density function 202 and a value of ρ=2 can result in standard Gaussian density function 204.

As mentioned above, the PDF of the coefficients of an image that is more in-focus can be less Gaussian in appearance. Since a value of ρ=2 yields the standard Gaussian density function, an auto-focus system can determine how Gaussian an image is by determining the value of its shape parameter, ρ. In particular, the auto-focus system can determine the value of the shape parameters for several candidate lens positions. The candidate lens position that produces a value of ρ that is farthest from a value of 2 can then be chosen as the lens position the produces the most in-focus image. In some embodiments, the values of the shape parameter for an image may typically exist in the range from ρ=0.3 . . . 2. Accordingly, since in this scenario ρ may not be greater than 2, an auto-focus system can determine which candidate lens position is most in-focus by determining which candidate lens position produces the smallest value of ρ.

Although there are various ways to determine the value of ρ, many of them can involve complex statistical techniques that require a substantial amount of calculating power and microchip space, and thus may not be suitable for implementation in hardware. Accordingly, in some embodiments, estimation techniques for determining ρ that are simpler to perform and less hardware demanding can be used. However, although specific examples of estimating ρ are discussed below, one skilled in the art could appreciate that the value of ρ can alternatively be calculated or estimated in any suitable manner.

One technique for estimating ρ uses the Method of Moments and data obtained from the DWT decomposition subbands. This technique can be derived from the property of a $n^{th}$-order absolute central moment of a generalized Gaussian random Variable, X, that is represented by:

$$E[|X-\mu_X|^n] = \left\{ \frac{\sigma_X^2 \cdot \Gamma\left(\frac{1}{\rho}\right)^{\frac{n}{2}}}{\Gamma\left(\frac{3}{\rho}\right)} \right\} \cdot \frac{\Gamma\left(\frac{n+1}{\rho}\right)}{\Gamma\left(\frac{1}{\rho}\right)} \quad 6$$

where n is the order of the moment, Γ is the standard Gamma function, and ρ is the shape parameter. $\sigma_X^2$ is the variance of the image data, $\mu_X$ is the mean of the image data, and each can be defined by, respectively:

$$\sigma_X^2 = \frac{1}{M} \sum_{i=1}^{M} (x_i - \mu_X)^2 \quad 7$$

$$\mu_X = \frac{1}{M} \sum_{i=1}^{M} x_i \quad 8$$

where M is the total number of samples of data, and $x_i$ (i=1, . . . , M) is the value of the sample.

For n=1, Equation (6) can be manipulated into:

$$R(\rho) = \frac{\sigma_X^2}{(E[|X-\mu_X|])^2} = \frac{\Gamma\left(\frac{1}{\rho}\right)\Gamma\left(\frac{3}{\rho}\right)}{\left(\Gamma\left(\frac{2}{\rho}\right)\right)^2} \quad 9$$

which is known as the generalized Gaussian ratio function or, more simply, is known as the Ratio Function. As can be seen from Equation (9), the Ratio Function can relate the observed statistics of a subband of the image signal (e.g., the first absolute moment, $E[|X-\mu_X|]$, and the variance, $\sigma_X^2$) to the shape parameter of that subband. As the variance and the first order absolute moment of a subband of an image signal can be readily calculated, Equation (9) provides a convenient and simple way of calculating the shape parameter of subbands of an image signal. Accordingly, Equation (9) can allow an auto-focus system to readily calculate a candidate lens position that suitably brings an image into focus, while still providing for a simplified system that can be more readily implemented in hardware.

Figure 3:
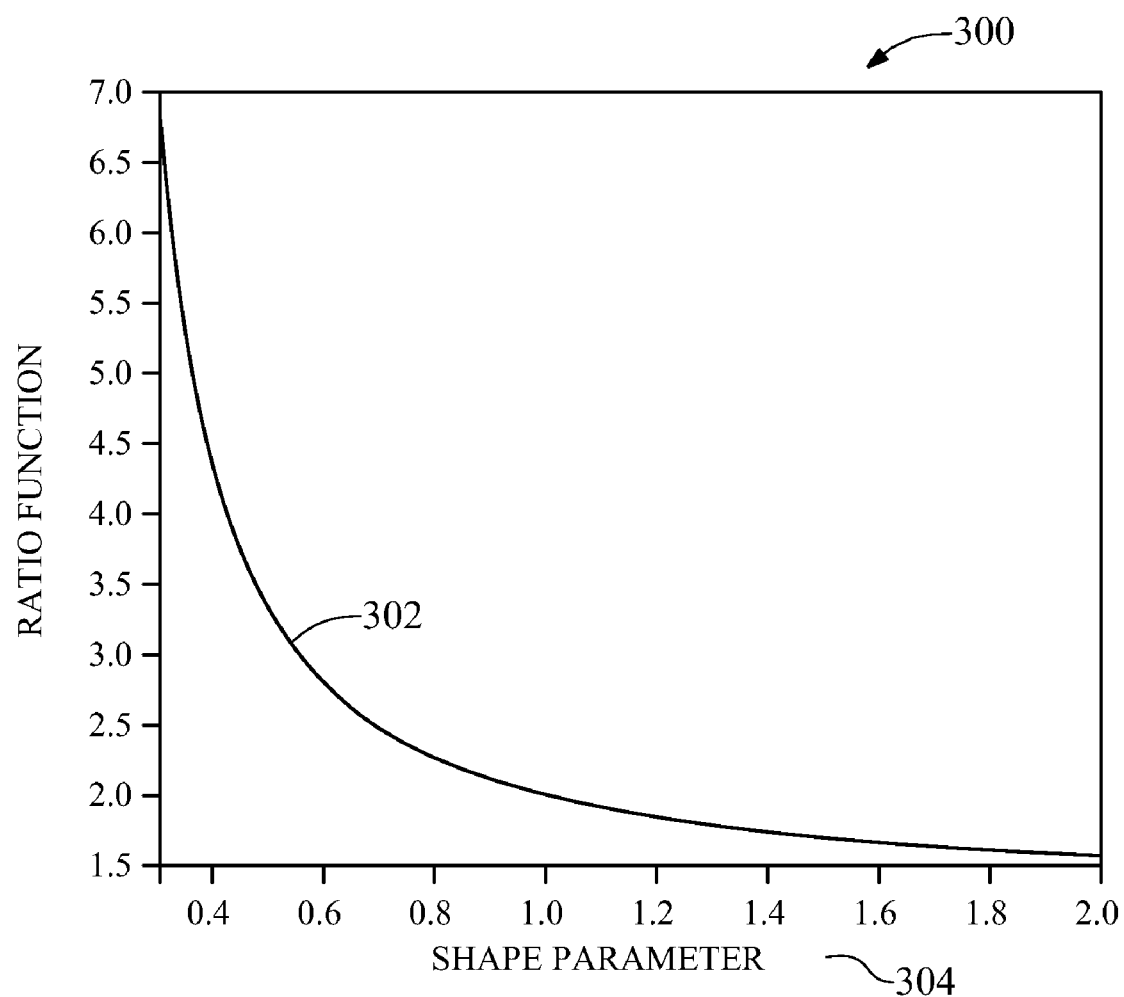
FIG. 3 shows an illustrative Ratio Function curve in accordance with some embodiments of the invention.

FIG. 3 shows illustrative graph 300 in which Ratio Function 302 is plotted for several values of shape parameter 304. As Ratio Function 302 is monotonically decreasing, Ratio Function 302 is invertible. Accordingly, the shape parameter of a subband can be determined by inverting Ratio Function 302. In other words, the value of the Ratio Function for a subband of an image signal can be calculated, and this value can then be used to calculate that subband's shape parameter.

Although estimating ρ through the Method of Moments was described for the case when n=1 (e.g., for the first moment), this was done for the purpose of illustration and not for limitation. Rather, one skilled in the art could appreciate that any other suitable value of n could be used with the Method of Moments or any other suitable method could be used to estimate ρ. As one example, in some embodiments, n=2 can be used to estimate ρ using the statistical measure known as kurtosis.

Any suitable DWT filter kernel can be used when estimating ρ. For example, a Cohen-Daubechies-Feauveau 9/7 wavelet kernel, a spline 5/3 wavelet kernel, or any other suitable kernel can be used. In the kernel name, the notation a/b can indicate the number of taps in, respectively, the low-pass and the high-pass filter of the kernel. A tap is the number of terms on the right hand side of a filter's equations. For example, a Nth order filter can have N+1 taps. Generally, the higher the number of taps in a filter (e.g., and thus the higher the value of a/b in a kernel name), the more complex the filter becomes. Accordingly, in some embodiments, a filter with fewer taps can be used because of their lower computational complexity and good performance. For example, in some embodiments, the spline 5/3 wavelet kernel can be used instead of the Cohen-Daubechies-Feauveau 9/7 to estimate the shape parameter.

In some embodiments, an auto-focusing imaging system may analyze a portion of a captured image, or "Region of Interest." As used herein, the term, "Region of Interest" can refer to at least a portion of an image that has been captured at a candidate lens position. The processing of the image (e.g., through a DWT to determine how blurry the image is) may be performed on just the Region of Interest rather than on the entire image. As one example, a Region of Interest with a window size of 400×300 pixels may be used when analyzing an image that has a resolution of 640×480 pixels. This Region of Interest may be positioned near the center of the image. For example, the top left corner of the window of the 400×300 Region of Interest can be anchored at the location (91, 121). Utilizing a Region of Interest may, for example, reduce the effect of lens aberrations present near the boundaries of that image. Although a specific size and location for the Region of Interest was given, this was for the purpose of illustration and not for limitation, and one skilled in the art could appreciate that any suitable Region of Interest size or location could alternatively be used. Moreover, when processing of an image is discussed herein, one skilled in the art could appreciate that processing could alternatively be performed on a Region of Interest rather than on the entire image.

Figure 4:
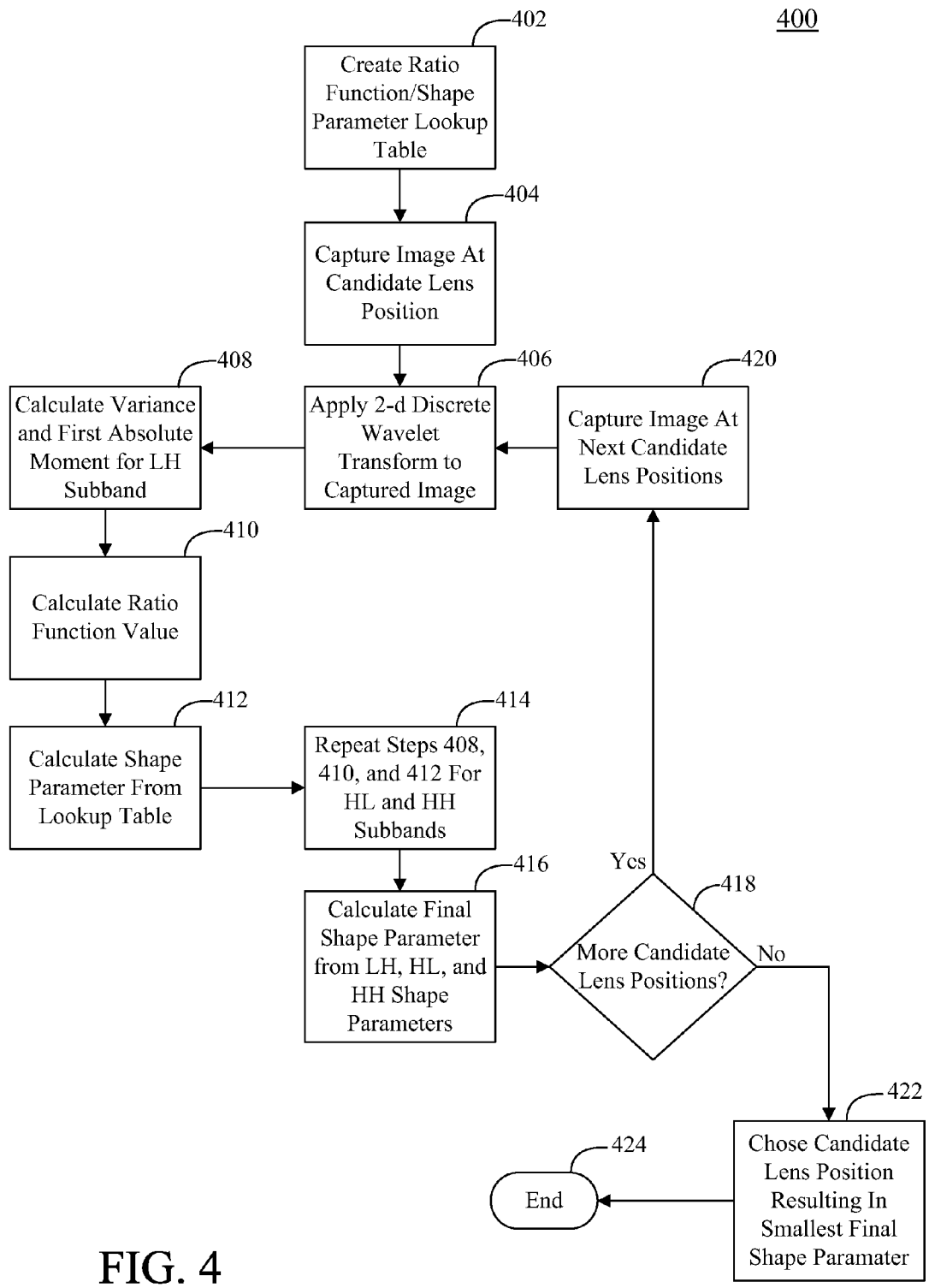
FIG. 4 shows an illustrative process for auto-focusing a system in accordance with some embodiments of the invention.

FIG. 4 shows illustrative process 400 for auto-focusing an imaging system by estimating the shape parameter at two or more candidate lens positions. At step 402, a lookup table containing Ratio Function values and their associated shape parameter values can be calculated. The values of this lookup table can be independent of image content and thus the lookup table may be universally used with various imaging systems and images. For example, the values of the lookup table can be independent of image luminance levels, image noise, or other image properties. Accordingly, in some embodiments, a lookup table may be pre-calculated a single time, and then this same lookup table can be used whenever an image is being auto-focused by the auto-focusing system. For example, step 402 may be executed a priori to calculate a lookup table and then store this lookup table in memory. When process 400 is subsequently executed, it may not be necessary to execute step 402 again. Rather, process 400 can start directly at step 404 and use the lookup table that is currently stored in memory. Moreover, since the same lookup table can be used on any image (e.g., regardless of luminance levels or other image properties) or in various imaging systems, process 400 can provide for a universal process that can be implemented in a wide variety of imaging systems and under a wide variety of situations.

The lookup table can include any suitable range and any suitable step size. For example, the lookup table can be calculated for the range of $\rho=0.3 \ldots 2$ or for any other suitable range. As another example, the step size can be equal to 0.01 or equal to any other suitable step size. As can be seen from FIG. 3, the shape of the Ratio Function becomes steeper as $\rho$ gets closer to zero. Accordingly, in some embodiments, the step size can be increased for smaller values of $\rho$. Table 1 shows an illustrative, simplified lookup table with a range of $\rho=0.3 \ldots 2$. In Table 1, the value of the step size increases as the value of $\rho$ decreases.

TABLE 1

| $R(\rho) = \dfrac{\sigma_X^2}{(E[|X - \mu_X|])^2}$ | $\rho$ |
|---|---|
| 6.66 | 0.30 |
| 5.20 | 0.35 |
| 4.32 | 0.40 |
| 3.74 | 0.45 |
| 3.33 | 0.50 |
| 3.03 | 0.55 |
| 2.81 | 0.60 |
| 2.48 | 0.70 |
| 2.27 | 0.80 |
| 2.11 | 0.90 |
| 2.00 | 1.00 |
| 1.81 | 1.25 |
| 1.70 | 1.50 |
| 1.52 | 2.00 |

At step 404, an image can be captured at a candidate lens position. The image can be captured in any suitable manner. For example, in some embodiments, the luma component of the image can be captured. As used herein, the "luma component" can represent the brightness values in an image, such as the black and white or achromatic version of that image.

At step 406, a 2-d discrete wavelet transform ("DWT") can be applied to the captured image. For example, the DWT can be applied to the luma component of the captured image. Application of the DWT can result in the creation of various subbands, such as the LL subband, the LH subband, the HL subband, and the HH subband. The resulting subbands can be, for example, buffered in memory. In some embodiments, only the LH, HL, and HH subband may be buffered in memory, and the LL subband may be discarded.

Any suitable wavelet kernel can be used when performing the DWT. For example, in some embodiments, a Cohen-Daubechies-Feauveau 9/7 wavelet kernel, a spline 5/3 wavelet kernel, or any other suitable kernel can be used. In some embodiments, the DWT or any other appropriate steps of process 400 may only be applied to a Region of Interest window of the captured image. For example, a Region of Interest window of any suitable size or positioned at any suitable location can be used.

At step 408, suitable statistics of the LH subband of the captured image can be calculated. For example, the variance and the first absolute moment of the LH subband can be calculated.

At step 410, a Ratio Function value can be calculated. For example, a Ratio Function value can be calculated using Equation (9) and the variance and the first absolute moment that were calculated at step 408.

At step 412, a shape parameter can be calculated from the lookup table. For example, the Ratio Function value calculated at step 410 and a lookup table, such as Table 1, can be used to calculate the shape parameter value.

Steps 408, 410, and 412 can then be repeated for the HL and HH subbands generated at step 406. In this manner, a shape parameter can be calculated for each of the HL and HH subbands of the captured image.

At step 416, a "final shape parameter" value can be calculated from the LH subband shape parameter, the HL subband shape parameter, and the HH subband shape parameter. As used herein, the term, "final shape parameter" can refer to a value that indicates the overall shape parameter of an image. As mentioned above, the LH, HL, and HH subbands can contain information related to horizontal edges, vertical edges, and diagonal edges, respectively. Accordingly, by taking the shape parameters of these three subbands into account, a final shape parameter can be calculated that represents the shape parameter, and thus the blurriness, of the full image. The final shape parameter can be calculated in any suitable manner. For example, in some embodiments, the final shape parameter can be calculated by adding the shape parameters of the LH, HL, and HH subbands. As another example, in some embodiments the final shape parameter can be calculated by averaging the shape parameters of the LH, HL, and HH subbands. Alternatively, the final shape parameter can be calculated through any suitable way.

At step 418, process 400 can determine whether there are any more candidate lens positions to be analyzed. In response to there being more candidate lens positions, an image can be captured at the next candidate lens position at step 420. Steps 406, 408, 410, 412, 414, and 416 can then be repeated to calculate a final shape parameter for the image captured at step 420.

In response to there being no more candidate lens position, process 400 can proceed to step 422. At step 422, the candidate lens position producing the smallest final shape parameter can be chosen. As mentioned above, a smaller shape parameter can correspond to an image that is less-Gaussian in its characteristics, thus indicating the image is less blurry. Accordingly, by choosing the candidate lens position producing the smallest final shape parameter, a lens position can be chosen that most suitably brings an image into focus. In some embodiments, rather than choosing the smallest shape parameter, a shape parameter that is farthest from a value of 2 can be chosen. Process 400 can then end at step 424.

Figure 5:
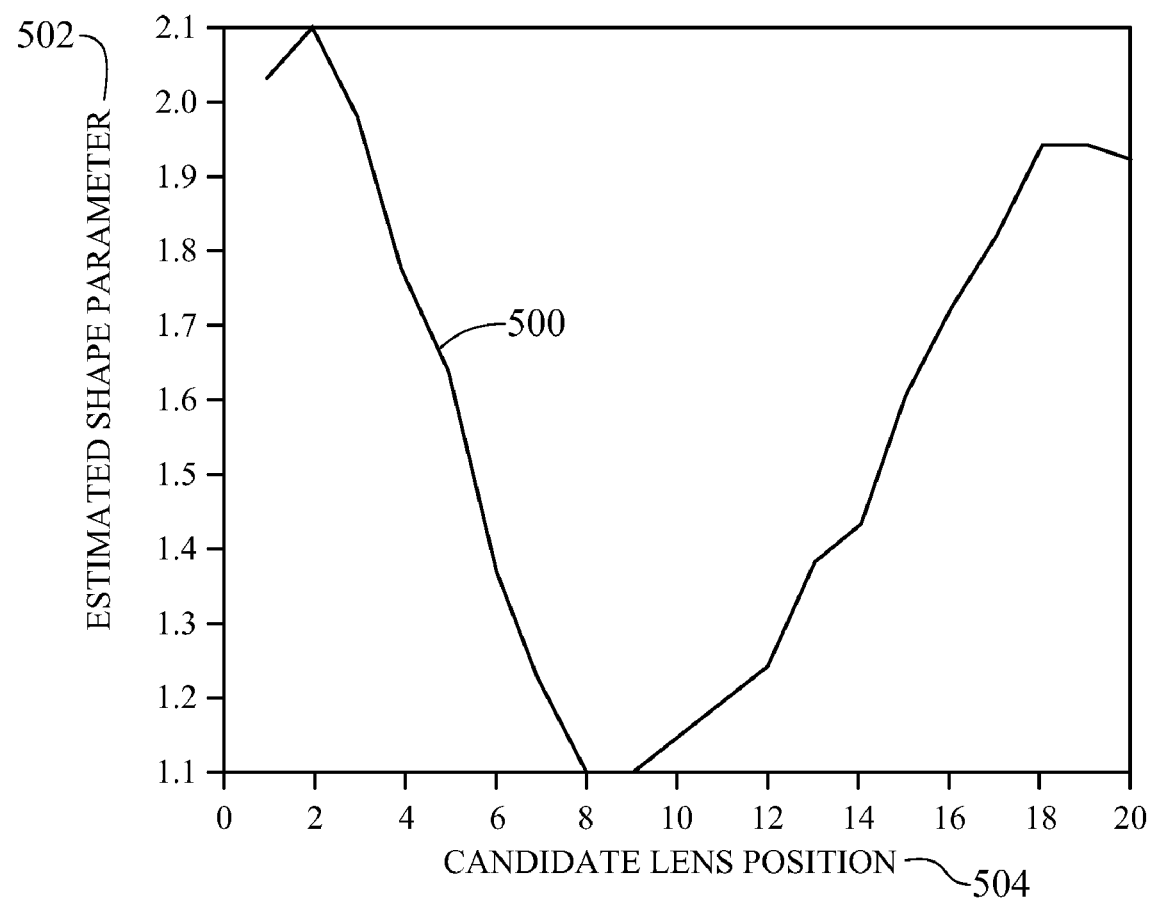
FIG. 5 shows an illustrative shape parameter curve in accordance with some embodiments of the invention.

FIG. 5 shows illustrative shape parameter curve 500 that can be created from values resulting from an auto-focusing process, such as process 400 of FIG. 4. As can be seen from FIG. 4, estimated shape parameter 502 can be calculated for two or more values of candidate lens position 504. The candidate lens position that results in the smallest value of estimated shape parameter 502 can then be chosen as the lens position producing the most suitably in-focus image. For example, in the system illustrated by shape parameter curve 500, a candidate lens position of roughly 8 can result in the smallest shape parameter value.

In some embodiments, estimation of the shape parameter can be simplified. For example, an auto-focusing system can be simplified by eliminating the need to perform a 2-d DWT. Performing a 2-d DWT can require an auto-focusing system to buffer two or more lines of image data (e.g., luma component data). This memory requirement may be undesirable as it can result in a bulkier, larger device and/or in a device with more hardware complexity, hardware gates, and storage space. Accordingly, in some embodiments, a form of a 1-d DWT transform can be used when estimating the shape parameter of a candidate lens position.

For example, in some embodiments, rather than performing a 2-d DWT on the rows and columns of the entire image (e.g., or on the Region of Interest) and estimating a shape parameter corresponding to these rows and columns, a 1-d DWT can be performed on a row of pixels of the image. A shape parameter for that row of pixels can be estimated by, for example, applying Equation (9) to that row of pixels. Each row of pixels of the image may then be independently analyzed through a 1-d DWT to estimate a separate shape parameter for each row of pixels. The shape parameters for each row of the pixels may be summed. Generally, if the image contains a minimum amount of blur (e.g., if the image is suitably in-focus), then the sum of shape parameters of the rows of pixels can also be at a minimum. In this manner, an image can be auto-focused through a system utilizing a 1-d DWT.

Using a 1-d DWT can beneficially reduce the hardware and microchip complexity of an auto-focusing system. Moreover, as the wavelet transform can be performed on streaming image data, it may not be necessary to buffer several lines of image data. Rather, in some embodiments, only those pixels that are currently in the wavelet kernel's region-of-support and are being processed can be buffered. In this manner, the memory requirements of the auto-focusing system can be reduced. Furthermore, a smaller wavelet kernel can be used. A smaller wavelet kernel can reduce the size of the auto-focusing system's memory and reduce the number of hardware gates, thus reducing the complexity and size of the system. As one illustration, a spline 5/3 wavelet kernel can be used to perform the 1-d DWT.

The spline 5/3 wavelet can include a 5-tap low-pass filter (e.g., with taps at [$-\frac{1}{8}$, $\frac{2}{8}$, $\frac{6}{8}$, $\frac{2}{8}$, $-\frac{1}{8}$]) and a 3-tap high-pass filter (e.g., with taps at [$-\frac{1}{2}$, 1, $\frac{1}{2}$]). In some embodiments, the low-pass subbands generated through the low pass filter of the wavelet kernel are not buffered and stored in memory. For example, when an inverse DWT operation is not to be performed (e.g., such as when performing image reconstruction), then the low-pass subbands may not be buffered. Furthermore, down-sampling may also be removed. Accordingly, when shape parameters are estimated through the use of a 1-d DWT, the DWT operation can essentially be performed by a high-pass filter operation. In this manner, the wavelet filter convolution can be reduced to a series of shift-add operations. Furthermore, processing the image data through a 3-tap high-pass filter rather than a higher order filter (e.g., a 5-tap filter, a 9-tap filter, or a higher tap filter) can provide for computational and hardware savings in the auto-focusing system. This can be contrasted with estimating shape parameters through the use of a 2-d DWT, when the low-pass filter operation may additionally be used for generating the HL and LH subbands.

As illustrated by Equation (9), when estimating a shape parameter, statistics such as the variance and first absolute moment of the coefficients of the pixels can be calculated. Since calculation of these statistics can require calculation of the mean of the coefficients, in 1-d DWT processing it may not be possible to calculate these statistics until the end of the row of pixels has been reached. In other words, all coefficients of the pixels in the row may need to be buffered in order to calculate the variance and first absolute moment of these coefficients. Accordingly, in some embodiments, alternate ways of calculating or approximating the variance and first absolute moment can be used to allow these values to be calculated on the fly, thus removing the need to buffer an entire row of coefficients.

To calculate the variance of a random variable, X, on the fly, it can be noted that:

$$\mu_X = E[X] \qquad 10$$

$$\sigma_X^2 = E[(X-\mu_X)^2] \qquad 11$$

where $\mu_X$ is the sample mean, $E[A]$ is the expected value (e.g., mean) of the random variable, X, and $\sigma_X^2$ is the sample variance.

Equation (11) can be expanded into:

$$\sigma_X^2 = E[(X^2 + \mu_X^2 - 2\mu_X X)] = E[X^2] + \mu_X^2 - 2\mu_X E[X] => \sigma_X^2 = E[X^2] - \mu_X^2 \qquad 12$$

Equation (12) indicates that the variance can be calculated from the mean of the coefficients squared and the mean of the coefficients. Thus, to calculate the variance for a row of pixels, the (1) sum of the coefficients and the (2) sum of the coefficients squared can be accumulated at each pixel. At the end of a row of pixels, these sums can be averaged to calculate the variance. In some embodiments, to avoid fractional results and/or underflow that might result from the squaring operation, the coefficients can be scaled by any suitable scaling factor as these sums are updated. For example, the sample mean (e.g., the mean of the coefficients in the row) and the sample variance (e.g., the variance of the coefficient in the row) of the row of pixels can be calculated by:

$$\hat{\mu}_X = \left\lfloor \frac{1}{M} \sum_{i=1}^{M} P \cdot x_i \right\rfloor \qquad 13$$

$$\hat{\sigma}_X^2 = \left\lfloor \frac{1}{M} \sum_{i=1}^{M} (P \cdot x_i)^2 \right\rfloor - \hat{\mu}_X^2 \qquad 14$$

where $\hat{\mu}_X$ is the sample mean, M is the total number of samples (e.g., coefficients), P is the scaling factor, $x_i$ is the current sample, $\hat{\sigma}_X^2$ is the sample variance, and $\lfloor \ \rfloor$ is the truncation operator. P can be any suitable scaling factor. In some embodiments, P can be a power of two such as, for example, 64. Generally, numbers that are a power of two can be simpler to implement in hardware.

To calculate the first absolute moment of the coefficients of a row of pixels on the fly, the first absolute moment can be approximated by:

$$E[|X-\mu_X|] \approx E[|X|] - |\mu_X| \qquad 15$$

The above approximation can be suitably accurate when, for example, the expected value of the samples is suitably close to zero. Generally, the statistically expected value of a high-pass subband is zero for an ideal case, and close to zero when there is a finite number of samples.

As indicated by Equation (15), the first order absolute moment can be approximated based on the mean of the absolute value of the coefficients and the mean of the coefficients. Accordingly, to approximate the first order absolute moment of a row of pixels on the fly, the (1) sum of the absolute values of the coefficients and the (2) sum of the coefficients can be accumulated at each pixel. At the end of each row, the average of these sums can be calculated and an approximation for the first absolute moment can be calculated based on these averages. In some embodiments, the coefficients can be scaled by any suitable scaling factor as these sums are updated. The approximation of the first order absolute moment can thus be represented by:

$$\hat{E}[|X - \mu_X|] \cong \left| \left( \frac{1}{M} \sum_{i=1}^{M} |P \cdot x_i| - |\hat{\mu}_X| \right) \right| \quad 16$$

Accordingly, to estimate a shape parameter of a candidate lens position using a 1-d DWT, three coefficient statistics can be updated at each pixel. These three coefficient statistics can be the (1) sum of the coefficients, the (2) sum of the coefficients squared, and the (3) sum of the absolute value of the coefficients. From these sums, the variance and the first order absolute moment of the coefficients of the pixel row can be calculated and/or approximated. The variance and the first order absolute moment can be used to estimate the shape parameter of the row of pixels. In this manner, a shape parameter for a row of pixels can be calculated on the fly without necessitating buffering of the coefficients of the entire row.

In some embodiments, in addition to estimating shape parameters through 1-d DWT processing of rows of pixels, green pixels of the raw Bayer data may additionally or alternatively be processed. For example, using a 1-d DWT on luma component data instead of 2-d DWT processing can result in the loss of diagonal edge information (e.g., resulting from the loss of the HH subband). Green pixels in a Bayer pattern generally lie along the diagonals of an image, and thus can provide diagonal edge information. Accordingly, in some embodiments, DWT processing can be performed on green pixel data to estimate shape parameters related to the diagonal edges of an image. As many imaging systems store green pixels of the raw Bayer data in line buffers by default, 1-d DWT processing of green pixels can generally be performed without necessitating additional system memory. Thus, in some embodiments, image data (e.g., luma component data), green pixel data of a Bayer pattern, or both can be analyzed through 1-d DWT processing to estimate a final shape parameter of an image.

In some embodiments, there can be two sets of green pixels in the Bayer pattern. For example, an image can have two diagonals, and there can be a set of green pixels along each diagonal. The green pixels on one diagonal can provide a first set of green component data, and the green pixels on the other diagonal can provide a second set of green component data. Thus, in some embodiments, shape parameters can be estimated for the luma component data and for each of the two diagonals of green component data. When estimating the final shape parameter, a weighing scale can be applied such that the luma component data and the green pixel data is weighted the same. For example, the luma component shape parameter can be weighted by ½, and each green component shape parameter can be weighed by ¼.

In some embodiments, rather than analyzing a "row of pixels" to estimate a shape parameter for that row, a "statistically significant" number of pixels can be analyzed. As used herein, the term "statistically significant number of pixels" can refer to a number of pixels which, when analyzed, can produce statistics regarding those pixels that suitably represent the pixels. For example, as mentioned above, statistics such as the mean and first absolute moment of the image data can be calculated when estimating a shape parameter. In order for the calculated mean and calculated first absolute moment to accurately represent the mean and first absolute moment of the image data, a statistically significant number of pixels can be analyzed. The statistically significant number of pixels can be, for example, 512 pixels, 512 or more pixels, less than the number of pixels in a row, more than the number of pixels in a row, the same as the number of pixels in a row, any other suitable number of pixels, any other suitable range of pixels, or any combination of the above.

Thus, a more generalized process for estimating a shape parameter through a 1-d DWT can calculate the shape parameter at the end of each "computation boundary." As used herein, the term, "computation boundary" can refer to a pixel at which a shape parameter is estimated. For example, an auto-focusing system can continue analyzing pixel data and updating the appropriate sums (e.g., the sum of the coefficients, the sum of the coefficients squared, and the sum of the absolute value of the coefficients) until a computation boundary is reached. When a computation boundary is reached, the current sums can be used to estimate a shape parameter. The computation boundary can be located, for example, at the end of a row of pixels, at the end of a statistically significant number of pixels, or in any other suitable location. Computation boundaries may mark the end and the start of a "pixel set." As used herein, the term "pixel set" can refer to a set of pixels used to calculate a shape parameter. In other words, the appropriate sums are updated at each pixel in the pixel set. At the end of the pixel set (e.g., at a computation boundary), a shape parameter can be calculated based on these updated sums.

Figure 6:
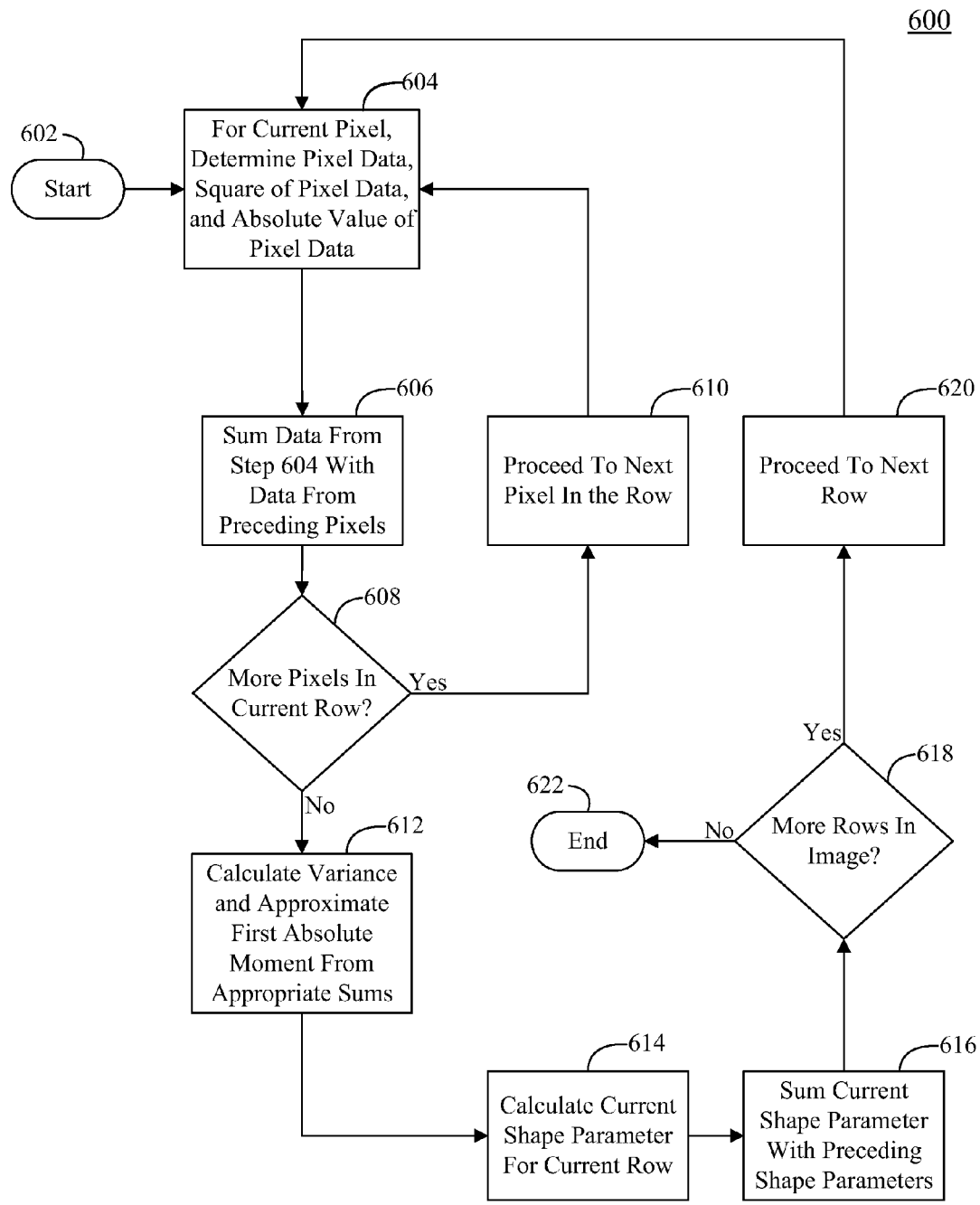
FIG. 6 shows an illustrative process for calculating a shape parameter for an image in accordance with some embodiments of the invention.

FIG. 6 shows process 600 for estimating the shape parameter of an image. Process 600 can start at step 602. At step 604, the current pixel can be analyzed. For example, the current pixel data, the square of the current pixel data, and the absolute value of the current pixel data can be determined. The current pixel data can be, for example, a coefficient generated by performing a 1-d DWT on the current image pixel data (e.g., on luma component data, on green pixel data of a Bayer pattern, or any other suitable current pixel data). As another example, the current pixel data can be a coefficient generated by applying a high-pass filter to the current image pixel (e.g., rather than applying a full DWT). In some embodiments, the high-pass filter can be less complex high-pass filter with a small number of taps such as a 3-tap high-pass filter, a 4-tap high-pass filter, or any other suitable high-pass filter.

At step 606, the appropriate sums can be updated based on the data determined at step 604. For example, the sum of the coefficients, the sum of the coefficients squared, and the sum of the absolute values of the coefficients can be updated.

At step 608, process 600 can determine whether a computation boundary has been reached. The computation boundary may, for example, be located at the end of a row of pixels, at the end of a statistically significant number of pixels, or in any other suitable location.

In response to the computation boundary not being reached, process 600 can proceed to the next pixel within the image. Steps 604, 606, and 608 may then continue to loop and update the sums until a computation boundary has been reached and all appropriate pixels have been analyzed.

In response to a computation boundary being reached, the variance can be calculated based on the sum of the coefficients and the sum of the coefficients squared. For example, the variance can be calculated by Equation (14). Similarly, the first order absolute moment can be approximated based on the sum of the coefficients and the sum of the absolute value of the coefficients. For example, the first order absolute moment can be approximated by Equation (16).

At step 614, the current shape parameter for the current pixel set can be estimated. For example, the current shape parameter can be calculated based on Equation (9) and/or an appropriate lookup table. At step 616, the image's shape parameter can be updated. For example, in some embodiments, the current shape parameter can be summed with the shape parameters estimated for the preceding pixel sets.

At step 618, process 600 can determine whether there are more pixel sets in the image. In response to there being more pixel sets, process 600 can proceed to the next pixel set at step 620. Steps 604, 606, 608, 610, 612, 614, and 616 can then continue to loop until all pixels and pixel sets in the image (e.g., or in the Region of Interest) have been analyzed. In response to there being no more pixel sets in the image, the process can end at step 622, and the currently updated shape parameter can be used as the final shape parameter for the image.

An auto-focusing system may, for example, use a process such as process 600 on each candidate lens position. To focus the image, a lens driver can be used to move the lens to the candidate lens position producing the smallest shape parameter. In some embodiments, the lens can be moved to the candidate lens positions producing a shape parameter with a value farthest from a value of 2.

As mentioned above, the shape parameter of an image can be estimated based on the Ratio Function of the image and a lookup table. In some embodiments, use of the Ratio Function, the lookup table, or both can be simplified.

Without any manipulation, a lookup table for estimating a shape parameter can include fractional coordinate values. For example, the simplified lookup table illustrated in Table 1 includes fractional coordinate values such as 6.66 and 5.20. Storing fractional values in hardware can require a substantial number of bits to maintain data fidelity. Accordingly, in some embodiments, the Ratio Function values, the shape parameter values, or both can be scaled by a suitable scaling factor. As one example, the Ratio Function values can be scaled by a factor of 4096 and rounded down. As another example, the shape parameter values can be scaled by a factor of 128 and rounded down. In this scenario, this "scaled Ratio Function" can be represented by:

$$\hat{R}_q(q) = \left\lfloor \frac{4096 \cdot \hat{\sigma}_X^2}{\left(\hat{E}[|X - \mu_X|]\right)^2} \right\rfloor = \left\lfloor \frac{\left\lfloor 4096 \left(\frac{1}{M} \sum_{i=1}^{M} |P \cdot x_i|\right)^2 \right\rfloor - 4096 (\hat{\mu}_X)^2}{\left(\hat{E}[|X - \mu_X|]\right)^2} \right\rfloor \quad 17$$

where $\hat{R}_q(\rho)$ is the scaled Ratio Function, M is the total number of samples, $x_i$ is the current sample, P is a scaling factor (e.g., to avoid fractions that might result from the scaling operation), $\hat{\mu}_X$ is the sample mean, $(E[|X-\mu_X|])$ is the first order absolute moment, $\hat{\sigma}_X^2$ is the sample variance, and $\lfloor \; \rfloor$ is the truncation operator.

In the illustration given by Equation (17), the Ratio Function values can be represented as 16-bit integers and the shape parameter values can be represented as 8-bit integers while maintaining data integrity and avoiding floating point numbers. Thus, the values of the Ratio Function curve can be effectively quantized in a manner that uses a total of three bytes of storage. However, although examples of a scaling factor of 4096 for the Ratio Function values and a scaling factor of 128 for the shape parameter values are provided herein, one skilled in the art could appreciate that any other suitable scaling factor or any other suitable rounding (e.g., rounding up) can alternatively be used.

Moreover, a lookup table may need to store a large number of Ratio Function values and shape parameter values to allow effective estimation of a shape parameter. Accordingly, in some embodiments, piece-wise linear approximation can be used to reduce the number of coordinate values that are stored in a lookup table.

To perform the piece-wise linear approximation, several "knee points" can be identified in any suitable manner on the Ratio Function. For example, the first derivative of the Ratio Function can be used to calculate the slope of the Ratio Function curve. Points on the Ratio Function curve in which the slope changes by a "large enough" threshold value can indicate the start of a new line segment, and thus can be chosen as knee points. The threshold value can be chosen in any suitable manner and can be, for example, a user chosen value, a predetermined value, a variable that can change based on predetermined conditions, or any other suitable value. A modified lookup table can be created that includes the identified knee points. Shape parameter values can then be estimated by using linear interpolation between the knee points.

Figure 7:
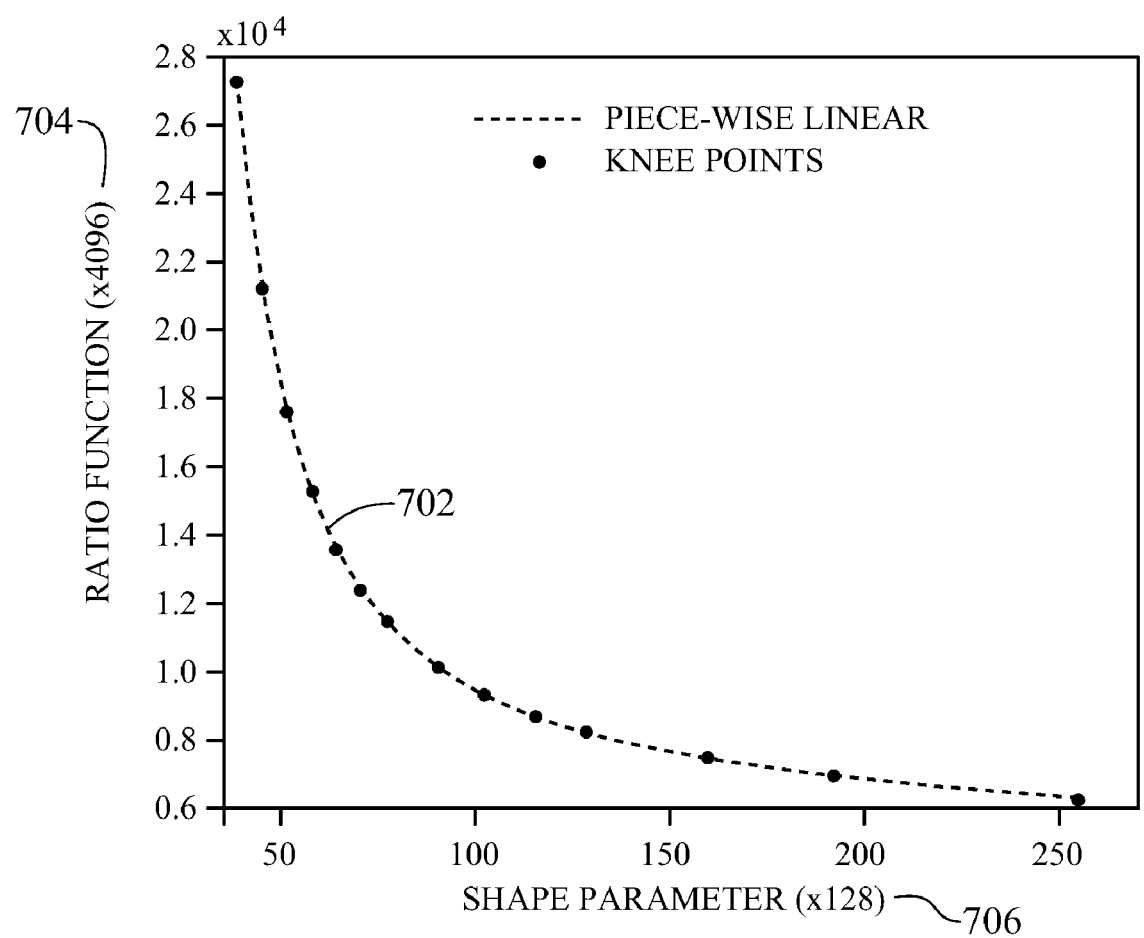
FIG. 7 shows an illustrative piece-wise linear Ratio Function curve in accordance with some embodiments of the invention.

FIG. 7 shows illustrative piece-wise linear Ratio Function curve 702. Piece-wise linear Ratio Function curve 702 may, for example, represent a piece-wise linear curve used to estimate shape parameter values for an image being analyzed through a 1-d DWT. In FIG. 7, Ratio Function values 704 have been scaled by a factor of 4096 and shape parameter values 706 have been scaled by a factor of 128. FIG. 7 further illustrates fourteen knee points. Between each knee point, the piece-wise Ratio Function curve can be linear in shape. However, the scaling factors, number of knee points, and location of knee points shown in FIG. 7 are for the purpose of illustration and not for limitation, and one skilled in the art could appreciate that any other suitable scaling factor or knee points could be chosen. Table 2 shows an illustrative lookup table that can correlate to piece-wise linear Ratio Function curve 702.

TABLE 2

| $\hat{R}_q(\rho) = \left\lfloor \dfrac{4096 \cdot \hat{\sigma}_X^2}{\left(\hat{E}[|X - \mu_X|]\right)^2} \right\rfloor$ | $\hat{\rho}_q = \left\lfloor 128 \cdot R^{-1}\left(\dfrac{\hat{R}_q(\rho)}{4096}\right) \right\rfloor$ |
|---|---|
| 27283 | 38 |
| 21295 | 45 |
| 17689 | 51 |
| 15317 | 58 |
| 13653 | 64 |
| 12431 | 70 |
| 11498 | 77 |
| 10177 | 90 |
| 9292 | 102 |
| 8662 | 115 |

TABLE 2-continued

| $\hat{R}_q(\rho) = \left\lfloor \dfrac{4096 \cdot \hat{\sigma}_X^2}{\left(\widetilde{E}[\|X-\mu_X\|]\right)^2} \right\rfloor$ | $\hat{\rho}_q = \left\lfloor 128 \cdot R^{-1}\left(\dfrac{\hat{R}_q(\rho)}{4096}\right) \right\rfloor$ |
|---|---|
| 8192 | 128 |
| 7420 | 160 |
| 6956 | 192 |
| 6188 | 255 |

When an auto-focusing system uses floating point numbers (e.g., such as when the image is being processed through a 2-d DWT), it may not be necessary to scale the values of the Ratio Function curve. Rather, in some embodiments, knee points can be identified and linear approximation can be performed without scaling the Ratio Function values and/or shape parameter values. For example, Table 3 shows an illustrative lookup table with 14 knee-points and floating point numbers. Table 3 may, for example, be used in an auto-focusing system that performs a 2-d DWT transform on the image data.

TABLE 3

| $R(\rho) = \dfrac{\sigma_X^2}{(E[\|X-\mu_X\|])^2}$ | $\rho$ |
|---|---|
| 6.66 | 0.30 |
| 5.20 | 0.35 |
| 4.32 | 0.40 |
| 3.74 | 0.45 |
| 3.33 | 0.50 |
| 3.03 | 0.55 |
| 2.81 | 0.60 |
| 2.48 | 0.70 |
| 2.27 | 0.80 |
| 2.11 | 0.90 |
| 2.00 | 1.00 |
| 1.81 | 1.25 |
| 1.70 | 1.50 |
| 1.52 | 2.00 |

In some embodiments, the Ratio Function can be simplified by approximating the Ratio Function with a parametric function. In this case, the need for a lookup table may altogether be eliminated. This approach may not only provide savings in memory by removing the need to store a lookup table, but may also provide savings in system complexity and in hardware gates by removing the need to perform a linear interpolation between knee points.

Any function can be used to approximate the Ratio Function that suitably maps the shape parameter space to the Ratio Function space. The amount of error that is allowed in this mapping can be, for example, a user defined value, a predetermined value, or any other value that results in an acceptable amount of error for the auto-focusing system. As one exemplary illustration, the Ratio Function for an auto-focusing system using a 1-d DWT can be approximated by the parametric function:

$$\hat{R}_q = 7\dfrac{2^{16}}{(\hat{\rho}_q - 18)} + 4096 \qquad (18)$$

Figure 8:
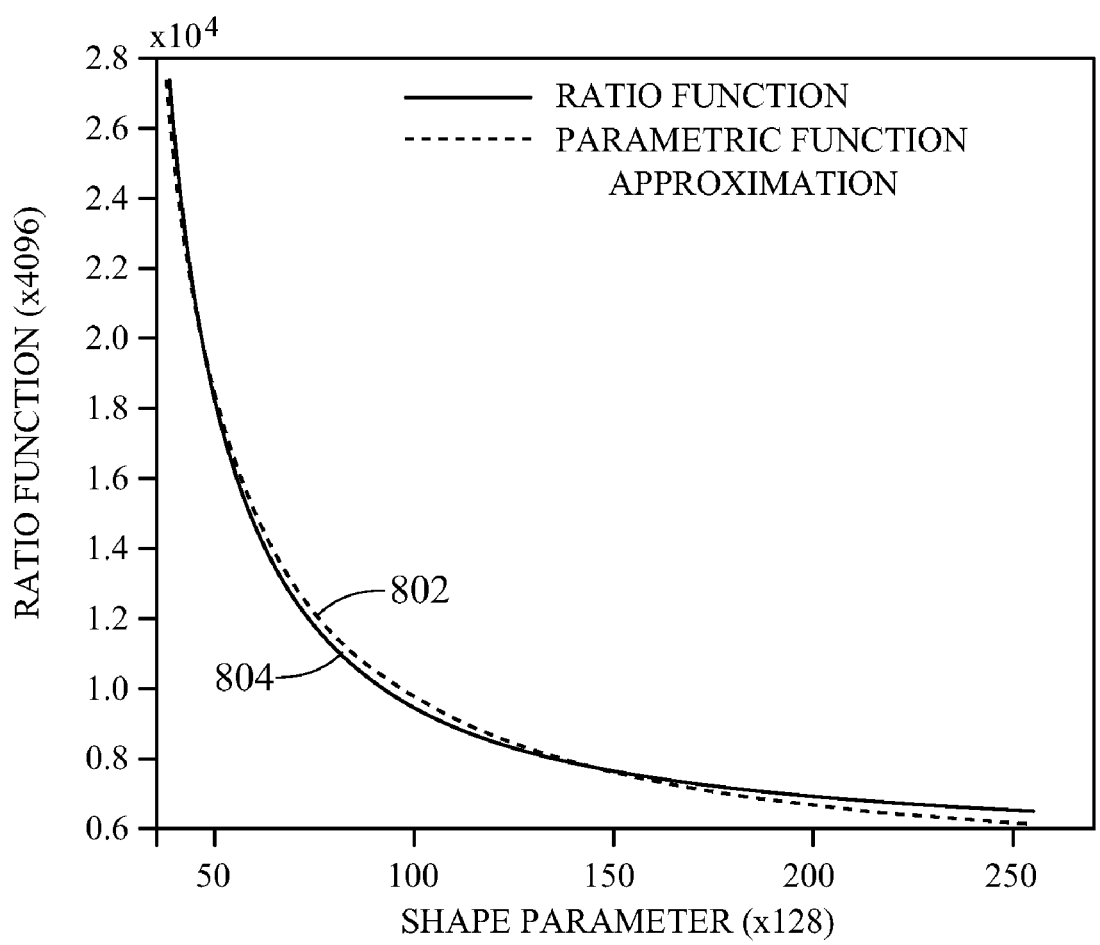
FIG. 8 shows an illustrative parametric Ratio Function curve in accordance with some embodiments of the invention.

FIG. 8 illustrates parametric function 802 that can approximate Ratio Function 804. A function to approximate the shape parameter values can be identified by, for example, inverting Equation (18). For example, as one illustration, the shape parameter values can be approximated by:

$$\hat{\rho}_q = 7\dfrac{2^{16}}{(\hat{R}_q - 4096)} + 18 \qquad (19)$$

In an auto-focusing system using floating point numbers and/or in a system that is not constrained to integers (e.g., such as when the image is being processed through a 2-d DWT), it can be possible to identify a potentially more suitable approximation to the Ratio Function. As one exemplary illustration, a floating-point function that can approximate a Ratio Function can be given by:

$$R_q = \dfrac{0.78}{(\rho - 0.155)} + 1.1 \qquad (20)$$

A function to approximate the shape parameter values can be identified by, for example, inverting Equation (18). As one illustration, the shape parameter values can be approximated by:

$$\rho_q = \dfrac{0.78}{(R - 1.1)} + 0.155 \qquad (21)$$

Accordingly, by approximating the shape parameter values with a function, such as the parametric functions illustrated by Equation (19) or Equation (21), the final shape parameter for an image can be determined without the use of a lookup table, knee points, or both. Rather, to estimate the shape parameter, an auto-focusing system can store the coefficients of the suitable parametric equation. This can beneficially result in significant savings in memory space, savings in hardware gate count, and/or savings in hardware complexity.

Figure 9:
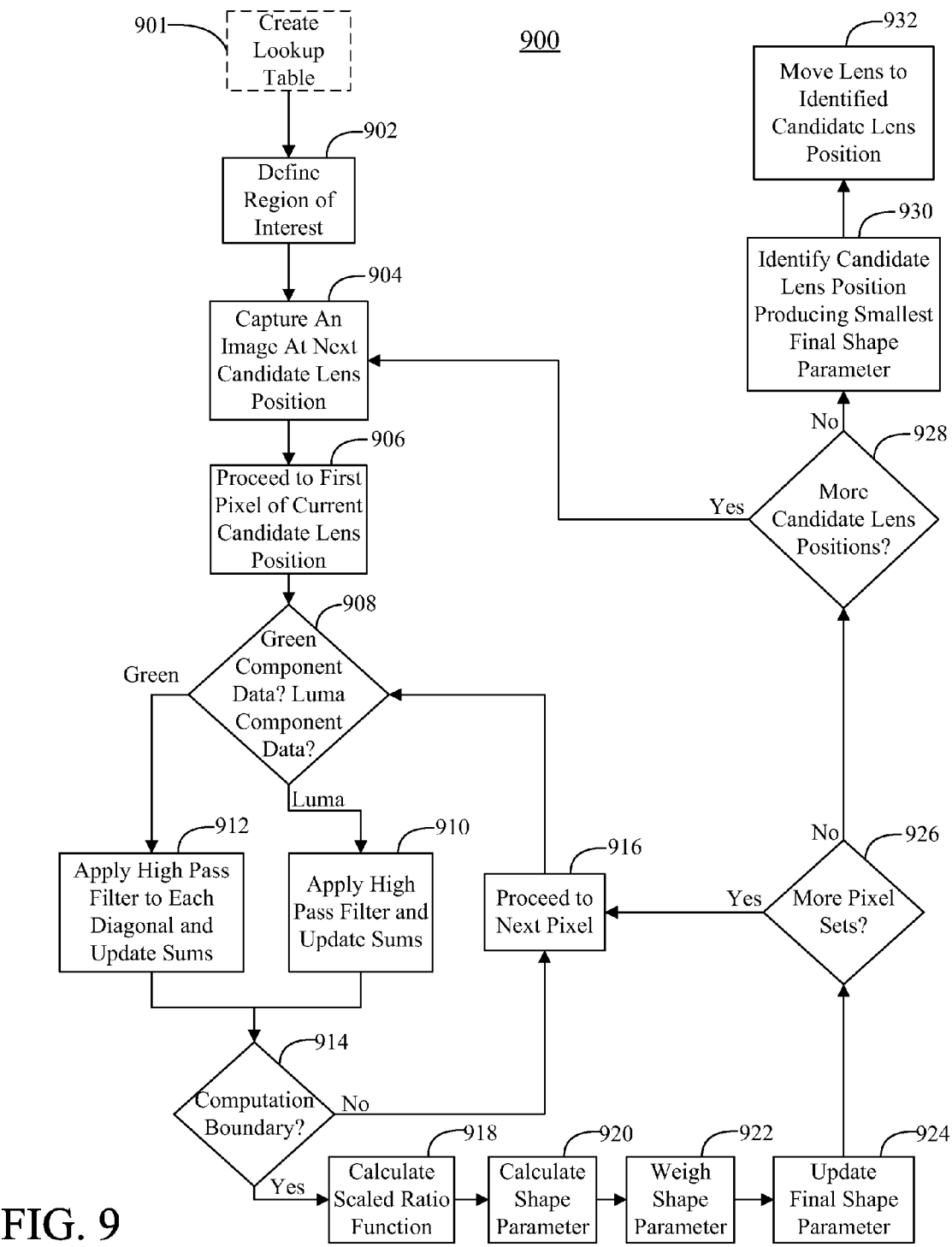
FIG. 9 shows an illustrative process for auto-focusing a system in accordance with some embodiments of the invention.

FIG. 9 shows illustrative process 900 for auto-focusing an image based on statistical blur estimation in accordance with some embodiments. For example, process 900 can represent a "hardware-optimized" algorithm that can simplify the hardware requirements of an auto-focusing system by performing steps such as applying the high-pass filter operation of a 1-d DWT, approximating the Ratio Function as a piece-wise linear curve or as a parametric function, or performing other suitable steps.

At step 901, a lookup table containing Ratio Function values and their associated shape parameter values can be calculated. In some embodiments, a lookup table may be pre-calculated a single time, and then this same lookup table can be used whenever an image is being auto-focused through process 900. For example, step 901 may be executed a priori to calculate a lookup table and then store this lookup table in memory. lookup table can be scaled by any suitable scaling factor to remove decimal points and reduce the memory requirements for storing the lookup table. As one example, the Ratio Function values can be scaled by a factor of 4096 and rounded down, and the shape parameter values can be scaled by a factor of 128 and rounded down. In some embodiments, a lookup table may not be necessary and step 901 can be optional. For example, when the shape parameters can be estimated through a parametric function approximating the inverse Ratio Function, then a lookup table may not be necessary and step 901 can be removed.

At step 902, a Region of Interest can be defined. The Region of Interest can include any suitable size and location.

For example, the Region of Interest can be chosen such that the effect of lens aberrations present near images boundaries are reduced.

At step 904, an image can be captured at the next candidate lens position. When this is the initial time step 904 is executed within process 900, process 900 can proceed to the first candidate lens position at step 904. Any suitable number of candidate lens positions can be used in process 900. For example, a higher number of candidate lens positions can result in an image that is more suitably focused yet may require a longer processing time. Accordingly, in some embodiments, the number of candidate lens positions can be chosen based on a tradeoff between quality versus speed. In some embodiment, the number of candidate lens positions can be a user tunable parameter that may, for example, be chosen before process 900 is initiated.

At step 906, process 900 can proceed to the first pixel of the current candidate lens position. For example, the current candidate lens position can correspond to the candidate lens position of step 904.

At step 908, process 900 can determine whether the pixel includes luma component data, green component data, or both. In response to the pixel including luma component data, process 900 can proceed to step 910. At step 910, a high-pass filter can be applied to the luma component data. For example, a 3-tap high-pass filter of a spline 5/3 discrete wavelet transform kernel can be applied to the luma component data. Alternatively, any other suitable high-pass filter can be applied. After the high-pass filter coefficients for the luma component data have been generated, the appropriate sums can be updated. For example, the sum of the coefficients, the sum of the coefficients squared, and the sum of the absolute value of the coefficients can be updated.

In response to the pixel including green component data, process 900 can proceed to step 912. At step 910, a high-pass filter can be applied to each diagonal of the green component data. For example, a 3-tap high-pass filter can be applied to each diagonal. Alternatively, any other suitable high-pass filter can be applied. After the high-pass filter coefficients for each diagonal of the green component data have been generated, the appropriate sums can be updated. For example, the sum of the coefficients, the sum of the coefficients squared, and the sum of the absolute value of the coefficients can be updated for each diagonal.

At step 914, process 900 can determine whether a computation boundary has been reached. The computation boundary can be located, for example, at the end of a row of pixels, at the end of a statistically significant number of pixels, or in any other suitable location and can indicate the end of a pixel set. In response to a computation boundary not being reached, process 900 can proceed to the next pixel in the pixel set at step 916 (e.g., the next pixel in scan order). Steps 908, 910, 912, and 914 may then continue to loop and update the appropriate sums until a computation boundary has been reached and all appropriate pixels have been analyzed.

In response to a computation boundary being reached, a scaled Ratio Function can be calculated at step 918. For example, the updated sums calculated at steps 912 and 910 can be used to calculate and/or approximate the variances and first absolute moments of the pixel set (e.g., a variance and a first absolute moment can be calculated for each diagonal of the green component data and for the luma component data). Scaled ratios function can be calculated from, for example, Equation (17) and the variances and first absolute moments.

At step 920, a shape parameter for each diagonal of the green component data and for the luma component data can be calculated. For example, in some embodiments the shape parameter can be calculated by using a lookup table, such as the lookup table generated at step 901. As another example, in some embodiments the shape parameter can be calculated by using a parametric function approximating the inverse Ratio Function, such as Equation (19).

At step 922, the shape parameter can be weighed by any suitable weighing scale. The weighing scale can be chosen such that the luma component data and the green pixel data are given the same amount of importance in determining the final shape parameter for the image. For example, the luma component shape parameter can be weighted by ½, and each green component shape parameter can be weighed by ¼.

At step 924, the final shape parameter can be updated. For example, the weighted shape parameter calculated at step 922 can be added to the weighted shape parameters of the preceding pixel sets in the image.

At step 926, process 900 can determine whether there are any remaining pixel sets in the image. In response to there being more pixels sets, process 900 can proceed to the next pixel (e.g., the next pixel in the next pixel set in scan order) in the image. Steps 908, 910, 912, 914, 916, 918, 920, 922, 924, and 926 can then continue to loop until shape parameters have been calculated for each pixel set in the image (e.g., or in the Region of Interest). At this point in process 900, the current, updated final shape parameter can be stored as the final shape parameter for the image at that candidate lens position.

In response to there being no more pixel sets in the image, process 900 can proceed to step 928. At step 928, process 900 can determine whether there are any more candidate lens positions that require processing. In response to there being more candidate lens positions, process 900 can capture an image at the next candidate lens position at step 904. Steps 904, 906, 908, 910, 912, 914, 916, 918, 920, 922, 924, 926, and 928 can then continue to loop until a final shape parameter has been calculated for each candidate lens position.

At step 930, process 900 can identify which candidate lens position produced the smallest final shape parameter. Having the smallest final shape parameter can indicate that the image captured at that lens position has the least amount of blur and thus is the most in-focus image. Accordingly, at step 932, the lens of the imaging system can be moved to the identified, candidate lens position. For example, a lens driver can be used to move the lens.

The processes discussed above are intended to be illustrative and not limiting. Persons skilled in the art can appreciate that steps of the processes discussed herein can be omitted, modified, combined, or rearranged, or that any combination of these steps or any additional steps can be performed without departing from the scope of the invention.

It will be apparent to those of ordinary skill in the art that methods involved in the invention may be embodied in a computer program product that includes a machine readable and/or usable medium. For example, such a computer usable medium may consist of a read only memory device, such as a CD ROM disk or conventional ROM device, or a random access memory, such as a hard drive device or a computer diskette, or flash memory device having a computer readable program code stored thereon.

The above described embodiments of the invention are presented for purposes of illustration and not of limitation.

What is claimed is:

1. A method of auto-focusing an imaging system, the method comprising:

capturing a plurality of images, wherein each image of the plurality of images is captured at a different candidate lens position of the imaging system;

estimating a Gaussianity value of each image of the plurality of images, wherein the Gaussianity value is estimated based on observed statistics of at least one high frequency subband of each image and a generalized Gaussian ratio function;

identifying a particular image of the plurality of images that comprises a smallest Gaussianity value; and moving a lens of the imaging system to a particular candidate lens position, wherein the particular image was captured at the particular candidate lens position.

2. The method of claim 1, wherein the estimating the Gaussianity value comprises:

applying a first stage of a discrete wavelet transform ("DWT") to each image of the plurality of images, wherein the application of the first stage of the DWT produces the at least one high frequency subband for each image; and calculating, for each image, the observed statistics of the at least one high frequency subband for each image.

3. The method of claim 2, wherein the DWT comprises one of a Cohen-Daubechies-Feauveau 9/7 wavelet kernel and a spline 5/3 wavelet kernel.

4. The method of claim 2, wherein applying a first stage of a DWT to each image of the plurality of image comprises:

applying the first stage of the DWT to a Region of Interest of each image of the plurality of images.

5. The method of claim 1, wherein determining a Gaussianity value comprises:

determining a shape parameter value for each image of the plurality of images.

6. The method of claim 5, wherein identifying the particular image of the plurality of images comprises:

identifying the particular image of the plurality of images that comprises a shape parameter value farthest from a value of two.

7. The method of claim 5, wherein identifying the particular image of the plurality of images comprises:

identifying the particular image of the plurality of images that comprises a shape parameter value that is least in value.

8. The method of claim 5, wherein determining a shape parameter value comprises:

estimating the shape parameter value by an $n^{th}$ order Method of Moments, wherein n corresponds to an order of a moment.

9. An auto-focusing system, the system comprising:

a lens operable to capture an image, wherein the image comprises a plurality of pixels grouped into a plurality of pixel sets;

a lens driver operable to move the lens to a plurality of lens positions, wherein the image is captured at a certain lens position of the plurality of lens positions; and a processor operable to:

sequentially process each pixel set by applying, on each luma pixel location of the plurality of pixel sets, a one-dimensional discrete wavelet transform ("1-d DWT") to produce a luma component coefficient for each luma pixel location;

sequentially process each pixel set by performing, on each green pixel location of a raw Bayer array of the image, the 1-d DWT on each diagonal to produce a first diagonal coefficient and a second diagonal coefficient for each green pixel location;

determine a shape parameter value for each pixel set based on each pixel set's generated luma component coefficients, first diagonal coefficients, and second diagonal coefficients; and determine a final shape parameter value for the image based on the shape parameter values of each pixel set; and wherein:

the auto-focusing system is operable to similarly generate a final shape parameter value for each of a plurality of images, wherein each image of the plurality of images is captured at a different lens position.

10. The system of claim 9, wherein the processor is further operable to:

identify a particular image of the plurality of images that is associated with a smallest final shape parameter value; and direct the lens driver to move the lens to a particular lens position at which the particular image was captured.

11. The system of claim 9, wherein the processor is further operable to:

update, at each luma pixel location of a pixel set, a sum of luma component coefficients, a sum of luma component coefficients squared, a sum of an absolute value of luma component coefficients; and determine, at the end of each pixel set, a variance and a first absolute moment for each pixel set based on that pixel set's updated sum of luma component coefficients, updated sum of luma component coefficients squared, and updated sum of the absolute value of luma component coefficients.

12. The system of claim 11, wherein the processor is further operable to:

determine a Ratio Function value for each pixel set based on each pixel set's variance and first absolute moment; and determine the shape parameter value for each pixel set based on each pixel set's Ratio Function value.

13. The system of claim 12, further comprising:

a memory operable to store a lookup table, wherein the lookup table comprises a plurality of Ratio Function values and a plurality of corresponding shape parameter values, and wherein:

the processor is further operable to determine the shape parameter value for each pixel set based on each pixel set's Ratio Function value and the lookup table.

14. The system of claim 13, wherein the plurality of Ratio Function values are scaled by a first scaling factor and the plurality of shape parameter values are scaled by a second scaling factor, and wherein the first and second scaling factors convert the plurality of Ratio Function values and the plurality of shape parameter values into integer forms.

15. The system of claim 14, wherein the first and second scaling factors are each a power of two.

16. The system of claim 12, further comprising:

a memory operable to store a lookup table, wherein the lookup table comprises a plurality of knee points of a Ratio Function curve, and wherein:

the processor is further operable to determine, for each pixel set, the shape parameter value by:

identifying at least two knee points of the plurality of knee points based on the Ratio Function value of that pixel set; and linearly interpolating the shape parameter value from that pixel set's identified at least two knee points.

17. The system of claim 16, wherein the knee points are determined by calculating a first derivative of the Ratio Function curve.

18. The system of claim 12, further comprising:
a memory operable to store coefficients of a parametric function, wherein the parametric function approximates a Ratio Function curve; and wherein:
the processor is operable to determine the shape parameter value for each pixel set based on each pixel set's Ratio Function value and based on the coefficients of the parametric function.

19. An auto-focusing system, the system comprising:
a lens operable to capture an image, wherein the image comprises a plurality of pixels grouped into a plurality of pixel sets;
a lens driver operable to move the lens to a plurality of lens positions, wherein the image is captured at a certain lens position of the plurality of lens positions;
a high-pass filter operable to sequentially process each pixel set by filtering each luma pixel location of the plurality of pixel sets, wherein the filtering generates a luma component coefficient for each luma pixel location; and
a processor operable to:
determine a variance and first absolute moment for each pixel set of the plurality of pixel sets based on each pixel set's generated luma component coefficients;
determine a Ratio Function value for each pixel set based on each pixel set's variance and first absolute moment;
determine a shape parameter value for each pixel set based on each pixel set's Ratio Function value; and
determine a final shape parameter value for the image based on the shape parameter value of each pixel set; and wherein:
the auto-focusing system is operable to similarly generate a plurality of final shape parameter values for a plurality of images, wherein each image of the plurality of images is captured at a different lens position.

20. The system of claim 19, wherein the processor is further operable to:
identify a particular image of the plurality of images that is associated with a particular final shape parameter value of the plurality of final shape parameter values farthest from a value of two; and
direct the lens driver to move the lens to a particular lens position at which the particular image was captured.

21. The system of claim 19, wherein the high-pass filter comprises at least three taps.

22. The system of claim 19, further comprising:
a memory operable to store a lookup table, wherein the lookup table comprises a plurality of Ratio Function values and a plurality of corresponding shape parameter values, and wherein:
the processor is further operable to determine the shape parameter value for each pixel set based on each pixel set's Ratio Function value and the lookup table.

23. The system of claim 22, wherein the plurality of Ratio Function values are scaled by a first scaling factor and the plurality of shape parameter values are scaled by a second scaling factor, and wherein the first and second scaling factors convert the plurality of Ratio Function values and the plurality of shape parameter values into integer forms.

24. The system of claim 23, wherein the first and second scaling factors are each a power of two.

25. The system of claim 19, further comprising:
a memory operable to store a lookup table, wherein the lookup table comprises a plurality of knee points of a Ratio Function curve, and wherein:
the processor is further operable to determine, for each pixel set, the shape parameter value by:
identifying at least two knee points of the plurality of knee points based on the Ratio Function value of that pixel set; and
linearly interpolating the shape parameter value from that pixel set's identified at least two knee points.

26. The system of claim 25, wherein the knee points are determined by calculating a first derivative of the Ratio Function curve.

27. The system of claim 19, further comprising:
a memory operable to store coefficients of a parametric function, wherein the parametric function approximates a Ratio Function curve; and wherein:
the processor is operable to determine the shape parameter value for each pixel set based on each pixel set's Ratio Function value and based on the coefficients of the parametric function.

* * * * *